United States Patent [19]

Mukaiyama

[11] 4,405,921
[45] Sep. 20, 1983

[54] LIQUID CRYSTAL DISPLAY DEVICE

[75] Inventor: Fumiaki Mukaiyama, Suwa, Japan

[73] Assignee: Kabushiki Kaisha Suwa Seikosha, Tokyo, Japan

[21] Appl. No.: 262,357

[22] Filed: May 11, 1981

[30] Foreign Application Priority Data

May 12, 1980 [JP] Japan ................. 55-62536

[51] Int. Cl.³ .............................................. G09G 3/36
[52] U.S. Cl. ....................................... 340/708; 340/784; 340/712
[58] Field of Search ............... 340/708, 707, 709, 712, 340/706, 784, 765

[56] References Cited

U.S. PATENT DOCUMENTS

| | | | |
|---|---|---|---|
| 3,618,029 | 11/1971 | Graven | 340/707 |
| 3,768,073 | 10/1973 | Rawson et al. | 340/707 |
| 3,775,005 | 11/1973 | Szabo | 340/707 |
| 3,898,636 | 8/1975 | Smith | 340/707 |
| 3,956,745 | 5/1976 | Ellis | 340/712 |
| 4,104,617 | 8/1978 | Bean et al. | 340/707 |
| 4,303,916 | 12/1981 | Hakaridani et al. | 340/712 |
| 4,329,684 | 5/1982 | Monteath et al. | 340/707 |

*Primary Examiner*—Marshall M. Curtis
*Attorney, Agent, or Firm*—Blum, Kaplan, Friedman, Silberman & Beran

[57] ABSTRACT

A light crystal display device which includes a liquid crystal panel and a light pen. The liquid crystal panel includes a plurality of display dots defined by spaced electrodes having a twisted nematic liquid crystal therebetween. The display dots are selectively driven by a drive circuit between light-transmissive and non-transmissive states in a predetermined flickering timing. The light pen selectively directs light to the display dots which is caused to flicker thereby. The flickered light is detected by a sensor in the light pen and produces positioning data signals representative of the sequence of dots selected.

14 Claims, 5 Drawing Figures

LIQUID CRYSTAL DISPLAY DEVICE

BACKGROUND OF THE INVENTION

This invention is directed to a liquid crystal display device and, in particular, to a liquid crystal display device wherein data may be written on a liquid crystal panel of the display device by means of a "light pen" which can be used for entering data in a data processor or the like.

In luster scanning type display devices, a light pen is provided for specifying particular points on the display area by means of comparing the output of a sensor in the light pen which includes a light receiving element with the scanning time of the display device. Such display devices, when use with a light pen, has been quite effective for inputting data to a processor.

However, with respect to a liquid crystal display device as compared with a cathode ray tube (CRT) display device, the response speed of the liquid crystal display device is much slower than that of the CRT. Moreover, the known methods of driving a liquid crystal display device are different from that of the driving method for the CRT. In the CRT display device, one frame is formed by gradually scanning the display area. However, liquid crystal display devices were not driven in this manner and were not provided with a light pen function for inputting data. See U.S. Pat. No. 3,967,253, for example.

A liquid crystal display which can be used for inputting data to a data processing machines or the like would have a great benefit in that the liquid crystal display has a low power consumption and a thin size. In recent years, the application of the liquid crystal display panel has developed from a seven-segment type display for forming several digits to a dot matrix display which defines a plurality of dots which form characters or digits. As a result, it is now possible to display a plurality of letters and digits as well as a graphic display on a liquid crystal display device. Accordingly, a liquid crystal display device wherein data can be input thereto by means of a light pen, is desired.

SUMMARY OF THE INVENTION

Generally speaking, in accordance with the instant invention, a liquid crystal display device having a liquid crystal panel wherein data can be written thereon means of a light pen for input to a data processor or the like, is provided.

The liquid crystal display device of the instant invention includes a liquid crystal display panel having a plurality of display dots in matrix array. Each display dot is defined by spaced electrodes having a liquid crystal material disposed therebetween. A driving circuit having a flickering circuit drives each of the display dots in a predetermined flickering time between light transmissive and non-transmissive states. A sensor detects the predetermined flickering timing of each of the display dots which indicates the position of each of the display dots.

A light pen defines the sensor and selectively directs light to the display dots in the liquid crystal display. The light is reflected from the display back to the light pen, the light being affected by the flickering of the display dots. Since each of the display dots or a group of display dots flickers in a different timing, the particular dot or dots from which the light is reflected can be easily detected by detecting the flickering reflected light.

Thus, using the liquid crystal display device in connection with data processing equipment, information or data can be easily input thereto by means of the liquid crystal display device of the instant invention.

Accordingly, it is an object of the instant invention to provide an improved liquid crystal display device.

Another object of the instant invention to provide a liquid crystal display device for inputting data to a data processing machine or the like.

A further object of the instant invention is to provide a liquid crystal display being including a light pen for inputting data to a data processor.

A still further object of the instant invention is to provide an improved liquid crystal display device for inputting information into a data processing machine, the liquid crystal display device having a low power consumption and a relatively small size.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
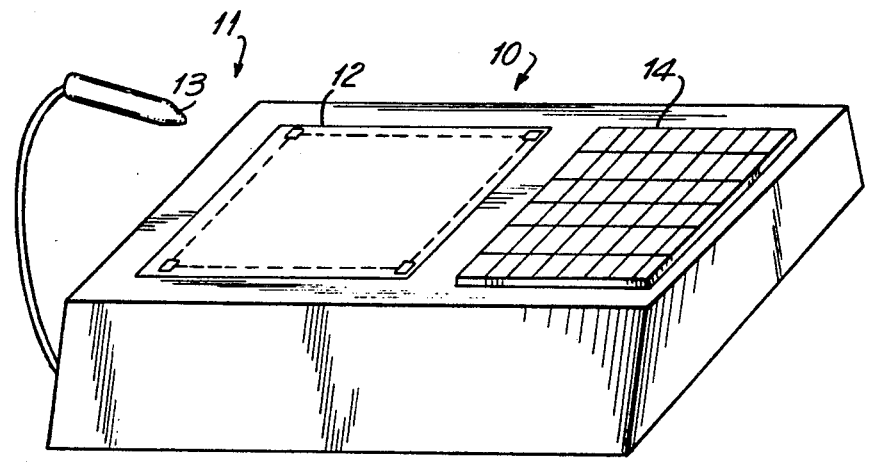
FIG. 1 is a perspective view of a data processing machine having a liquid crystal display device constructed in accordance with the present invention.

Reference is first made to FIG. 1 wherein a data processing machine, generally indicated as 10, includes a liquid crystal display device, generally indicated as 11, and constructed in accordance with the instant invention. Data processing machine 10 also includes a keyboard 14 for controlling data machine 10.

Liquid crystal display device 11 includes a liquid crystal panel 12 and a light pen 13. In data processing machine 10, data can be input or output for an arithmetic operation function or a control function. Liquid crystal panel 12 provides a dot matrix display having a plurality of display dots in matrix array as is disclosed, for example, in U.S. Pat. No. 3,967,253.

The present invention will be explained by considering a 16×16 dot matrix array for crystal panel 12. However, it is noted that a greater or lesser number of dot matrices can be provided depending on the application and use of the liquid crystal display device. Light pen 13 is used in conjunction with liquid crystal panel 12 to "write" data on liquid crystal panel 12 for input into data processing machine 10.

When indicating a specific point or display dot by using a light pen, it is preferable that the light pen be thin in order to increase the resolution of the small-size dot unit. It may be preferable to collect several dots together in a group to define one block in the dot matrix display. In the discussion which follows, it will be assumed that each display dot defines one block or unit of the dot matrix array. According to the invention hereinafter described, liquid crystal display panel 12 and light pen 13 make it possible to specify a specific block or display dot on display panel 12 for use in connection with a computer or data terminal. The input operation becomes very easy for inputting this data by using the liquid crystal display device of the present invention.

Figure 2:
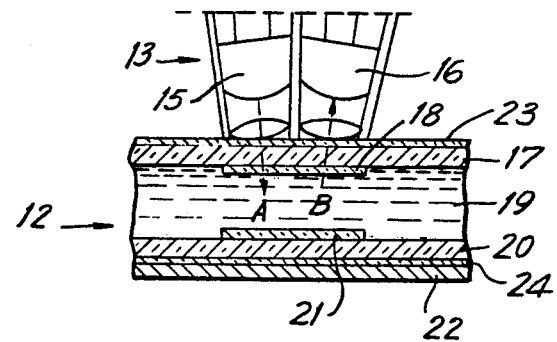
FIG. 2 is a sectional view of a light pen and liquid crystal panel constructed in accordance with the present invention.

Reference is now made to FIG. 2 in order to fully describe the construction of liquid crystal panel 12 and light pen 13 in accordance with the present invention. Light pen 13 includes a light emitting diode 15 for directing light to display panel 12. Light pen 13 also includes a light sensor 16 such as a photo diode or a photo transistor. Sensor 16 detects the light reflected from display panel 12 as hereinafter more fully described. As depicted in FIG. 2, light pen 13 is adjacent to or in contact with liquid crystal panel 12 when "writing" thereon.

Liquid crystal panel 12 includes an upper transparent substrate 17 such as glass having an upper transparent electrode 18 formed on the lower surface thereof. A lower transparent substrate 20 includes a lower transparent electrode 21 formed on the upper surface thereof which faces upper electrode 18. A liquid crystal material 19 is disposed between substrates 17 and 20 and has the required optical properties. Liquid crystal material 19 is preferably in the twisted nematic (TN) mode. An upper polarizer plate 23 is provided on the upper surface of upper substrate 17 and a lower polarized plate 24, the polarization direction of which is oriented perpendicular to that of polarizer plate 23, is provided on the lower surface of lower substrate 20. A reflector 22 is provided on the lower surface of display panel 12 which reflects light entering from above back out of display panel 12.

As is well known, liquid crystal panel 12 is a display device wherein light is either transmitted through the liquid crystal panel or not transmitted therethrough depending on the twisted angle of liquid crystal material 19 which is controlled by the electric potential applied between upper electrode 18 and lower electrode 21. In a transmissive state of display panel 12 where liquid crystal material 19 is not actuated, light passes through the upper polarizer plate 23 and is polarized in the direction of polarization of polarizer 23. The light is twisted by liquid crystal material 19 to change the direction of polarization thereof so that the light can pass through lower polarizer plate 24. The light is then reflected by reflector 22 back out of display panel 12 in the same manner. In a non-transmissive state where the liquid crystal material is actuated, the light will pass through upper polarizer plate 23 into liquid crystal material 19, but due to the twisted angle of liquid crystal material 19, the light will not be twisted and will not pass through lower polarizer plate 20. Therefore, the light will not be reflected back out of liquid crystal panel 12.

Accordingly, in a transmissive state, the light provided from light emitting diode 15, the path of which is indicated by arrow A, passes through display panel 12 and is reflected off of reflector 22 to return out of liquid crystal panel 12 in the direction of arrow B and is detected or sensed by sensor 16. When the liquid crystal panel is in a non-transmissive state, the light from light emitting diode 15 is not reflected back to sensor 16 and therefore is not detected.

Utilizing these optical characteristics of a liquid crystal dot matrix display, the present invention provides a liquid crystal display device where the light pen and the circuitry in conjunction therewith can determine the specific dot or dots to which light is transmitted and reflected by flickering each dot between transmissive and non-transmissive states in a different predetermined timing. Even when each dot is flickering, no real distinction can be made between "lit" and "unlit" dots. Moreover, by utilizing a liquid crystal panel driven in two frequency matrix-addressing method such as disclosed in U.S. Pat. No. 4,236,155, wherein a superior response speed is obtained, it is possible to adjust the flickering frequency of the dots so that a person cannot visually perceive the flickering of the dots.

Figure 3:
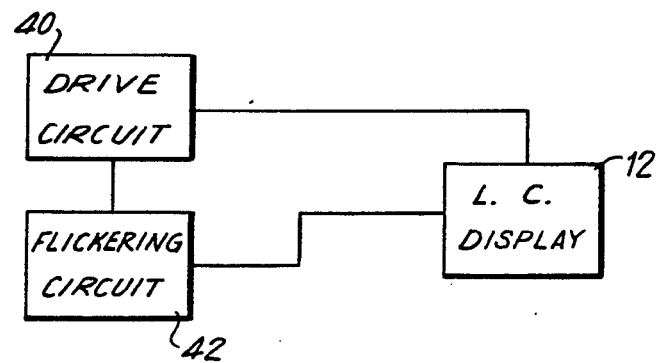
FIG. 3 is a block circuit diagram of the driving circuit of the liquid crystal display device of the present invention.

Reference is now made to FIG. 3 which depicts a block circuit diagram of the driving circuit for liquid crystal display panel 12. A driving circuit 40 provides the driving signals for driving liquid crystal display panel 12. A flickering timing circuit 42 is provided which produces the flickering timing signals for flickering each of the display dots or group of display dots on liquid crystal display panel 12 as hereinafter described.

Figure 4:
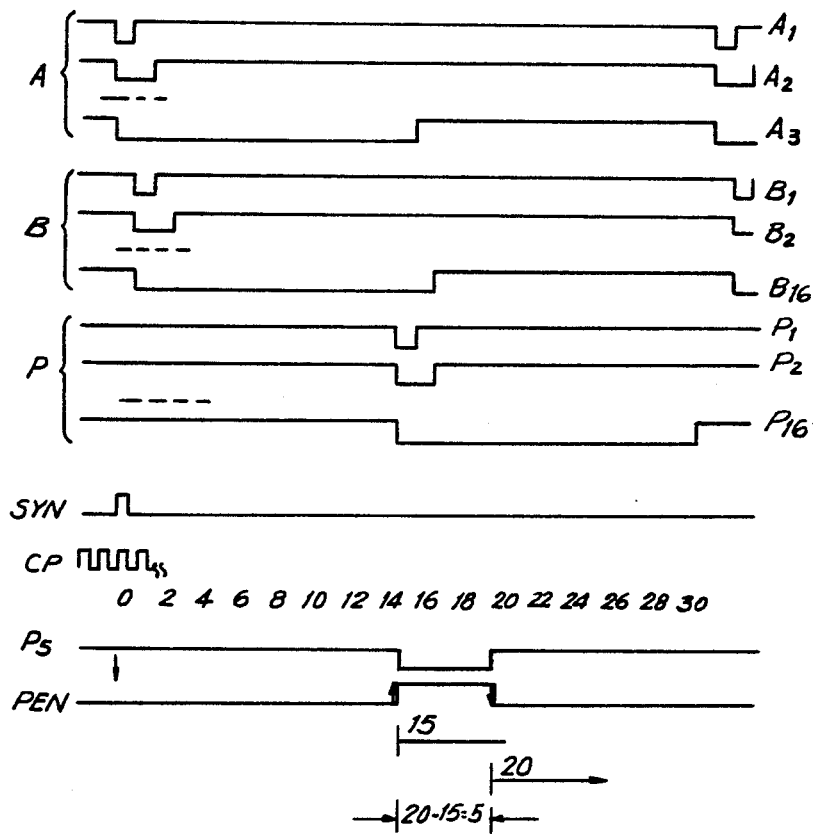
FIG. 4 is a timing chart depicting the flickering timing of selected liquid crystal display dots of the liquid crystal panel.

Referring now to FIG. 4, the flickering timing for selected dots in the dot matrix display will now be described. As aforenoted, the liquid crystal display includes a 16×16 dot matrix array for purposes of discussion herein, each dot forming a separate block. It is noted, however, that several dots may form a single block. Reference designations A, B . . . P represent each row in the dot matrix array and numerals 1, 2 . . . 16 represent each column in the dot matrix array. In this description, a single dot or block is considered to be an individual flickering unit. In FIG. 4, only nine representative dots or blocks will be considered. $A_1$, $A_2$ and $A_{16}$ refer to the first, second and sixteenth column in the A row, respectively. $B_1$, $B_2$ and $B_{16}$ refer to the first, second and sixteenth column in the B row, respectively. $P_1$, $P_2$ and $P_{16}$ refer to the first, second and sixteenth column in the P row, respectively. Thus, nine specific dots or blocks in the 16×16 matrix array, which altogether includes 256 dots or blocks, will be considered for the purpose of discussing the flickering timing of each of these blocks.

The signals for driving the nine blocks or dots under consideration are depicted in FIG. 4. Where the level of the signal is "High", that particular dot is actuated and non-light transmissive and accordingly light will not be reflected through that dot. Where the level of the signal is "Low", the dot is not actuated and light transmissive and light will be reflected therethrough.

Referring to FIG. 4, it is noted that each dot has a different flickering timing. In particular, the starting time of the Low signal is varied by each row. That is, in each row, the time between each non-actuating Low signal is the same but the start of the Low signal is shifted for each consective row. Thus, referring to the signals for block $A_1$, $B_1$ and $P_1$, it is noted that the time between each Low signal is equal but that the Low signal comes in at a different timing.

The time period of the non-actuating Low signal period varies for each column. That is, the time period for each Low non-actuating signal is consecutively increased from column to column. Thus, referring to signal $A_1$, $A_2$ and $A_{16}$ it is noted that the length of the Low signal is different for each one. Thus, completely different flickering timing is provided to each of the 256 (16×16) flickering units.

A clock signal CP is the timing signal which is determined according to the response time of the liquid crystal material. The period in which all of the flickering units are flickered is called the frame period. The frame period in accordance with FIG. 4 includes only 32CP clock signals. Thus, it is effective to reduce the frame period in order to decrease the response time.

The flickering units selected are detected as follows. The row position is specified by comparing the starting time of the Low non-actuating signal detected by sensor 16 in light pen 13 with the timing memorized in the memory of a control circuit. The column position is specified by detecting the length of the non-actuating period which is also memorized. The scale 0 to 30 in FIG. 4 refers to the contents of a counter 30 (FIG. 5) to which the clock signals CP are input. These are decimal values. These decimal values of the counter are synchronized with the flickering timing.

For example, referring again to FIG. 4, reference is made to the flicker of dot $P_5$. At counter value 15 on the scale, the actuating period changes into the non-actuating period. Then, during the period from 15 to 19, the non-actuating period continues and the dot is light transmissive. At counter value 20, the actuating period begins again. PEN indicates the output of sensor 16 of light pen 13. During the non-actuating condition, since the light from light emitting diode 15 is reflected through liquid crystal panel 12 back to photo sensor 16, the output is High during the period from 15 to 20 or for five counting units.

It is possible to change the actuating and the non-actuating period from that depicted in FIG. 4. However, this is disadvantageous since the rate of the actuating period is reduced thereby reducing the contrast of the liquid crystal panel. If the dots are flickered as depicted in FIG. 4, the duty ratio for the actuating condition within one frame in never less than one-half.

It would also be possible to fix the time length of the actuating and the non-actuating periods for each flickering unit and only vary the timing of change from the actuating to the non-actuating condition. However, in this case, if the ratio of the actuating period to the non-actuating period is 1:1, the frame period must include 256 CP clock signals corresponding to the 256 flickering units. Thus, the frame period becomes large and the response time of the liquid crystal is consequently increased.

It is convenient to apply a gate for the driving input of each dot unit in order to give the flickering timing as depicted in FIG. 4. In particular, two input AND gates are included in the circuit in FIG. 3 between display panel 12 and driving circuit 40 and flickering circuit 42. The driving circuit signal from driving circuit 40 is input to one input of the AND gates and the flickering timing signal from flickering timing circuit 42 is input to the other input gate of the AND gates. The flickering timing signal is High at the time of the actuating condition.

Figure 5:
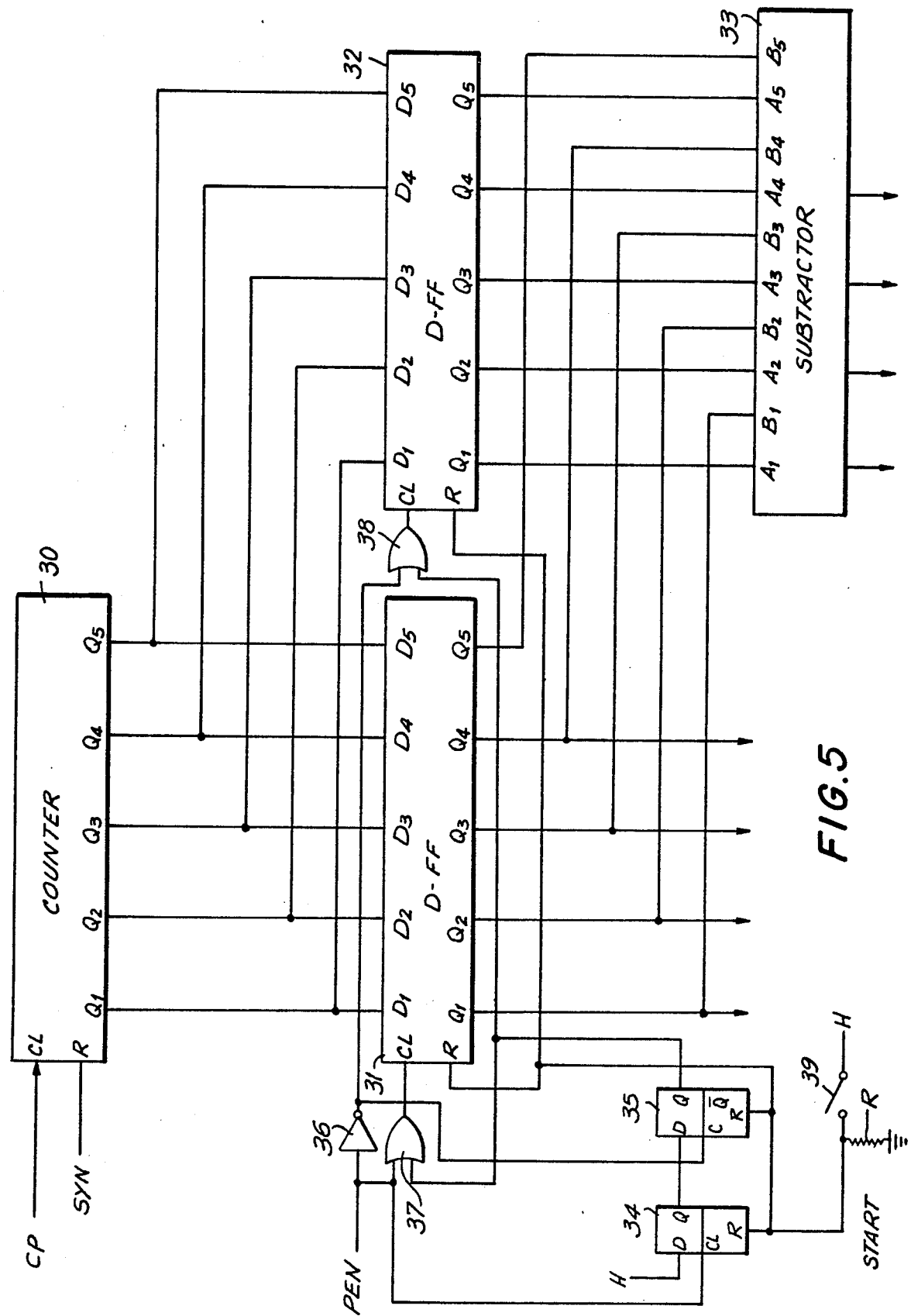
FIG. 5 is a block circuit diagram of the detecting circuit of the liquid crystal display device of the present invention.

Reference is not made to FIG. 5 which depicts a detector or converter circuit for determining a particular dot position on the liquid crystal display panel based on the output PEN of light pen 13. A ripple counter 30 having 5-bits is reset by a SYN signal (FIG. 4) at the time that power is first applied to the circuit. Memories 31 and 32 receive the output from counter 30. Memories 31 and 32 are each 5-bits in parallel and include D-type flip-flops for memorizing the contents of counter 30 when the clock trigger CP is supplied. Binary subtractor 33 receives the outputs from both memory 31 and memory 32 and calculates the length of the non-actuating period of the liquid crystal display dot selected according to the contents of memories 31 and 32 which determines the column position.

The output PEN signal from light pen 13 is utilized as the clock trigger of memory 31 through OR gate 37. The output PEN signal is inverted through an inverter 36 and is input into memory 32 wherein the clock signal from the non-actuating to actuating condition of PEN is used as a trigger. In this case, the trigger is a master-slave type trigger which triggers at the time of a level change from Low to High. D-type flip-flops 34 and 35 close OR gates 37 and 38 when one flickering action from actuating to non-actuating condition or from non-actuating to actuating condition is accomplished. Flip-flops 34 and 35 prevent the wrong converter from operating by the following flickers or by the light noise from outside when the light pen is not writing on the liquid crystal panel. A switch 39 which is biased by a pull down resistor R is turned on to reset memories 31, 32, 34 and 35.

In the converter circuit depicted in FIG. 4, the output of flip-flop 31 indicates the row position data and the output of down counter 33 indicates the column position data. The change of the Q output level of flip-flop 35 from Low to High indicates that the light pen reacts with a given dot position for the first time. This change in information can also be used as status information.

It is noted that it is convenient to dispose reset switch 39 on the body of light pen 13. If the emitting and receiving elements are actuated only during the period of time when the reset is turned on to the time when the light pen reacts to the display dot position, power consumption can be greatly reduced.

It is also noted that the present invention is adaptable for use with other constructions of liquid crystal display panels other than those depicted in FIG. 2. For example, the liquid crystal display panel can be transparent and have a back light source to replace the reflective substrate 22. In this case, the emitting diode 15 of the light pen 13 is not required and only a sensor element 16 for the light pen is necessary.

The liquid crystal display device of the present invention provides a light pen/liquid crystal panel wherein data can be input to a data processor or the like by using the light pen to "write" on the liquid crystal panel. The dot flickering method disclosed allows the convertor circuit to detect which particular dots have been selected and to convert this information into data readable material.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display device comprising liquid crystal display means including a plurality of liquid crystal display dots arranged in a matrix array to define a group of rows and a group of columns, each said liquid crystal display dot having a row position and a column position, driving circuit means including flickering means for selectively flickering; each of said display dots between light-transmissive and non-transmissive states in a predetermined flickering timing, said flickering means providing a different switching time between said light-transmissive and non-transmissive states for each said row and column, respectively, in one of said groups of rows and columns of said display dots, said flickering means providing a different length of time that each respective row and column in the other one of said groups of rows and columns is in said light-transmissive state whereby each display dot has a unique flickering timing, light means for selectively directing light to selected display dots, said light being flickering by the switching of said selected display dots through which the light passes, and sensor means including light receiving means for detecting the flickered light passing through said selected display dots.

2. The liquid crystal display device, as claimed in claim 1, wherein each display dot is defined by a first electrode and a second electrode spaced from said first electrode and having a liquid crystal material disposed therebetween, said display dots being selectively driven between said light-transmissive and non-transmissive states by said driving circuit means in said predetermined timing.

3. The liquid crystal display device, as claimed in claim 2, wherein said sensor means includes converter circuit means for indicating the position of said selected display dots on said display means in response to the flickered light detected by said light receiving means.

4. The liquid crystal display device, as claimed in claim 3 wherein said flickering means selectively switches each said display dot between said light-transmissive and non-transmissive states in a different timing, light from said light means being flickered in said different timing when passing through respective display dots.

5. The liquid crystal display device, as claimed in claim 4, wherein said converter circuit means transforms the different flickering timing of light passing through a selected display dot and detected by said light receiving means into dot positioning data.

6. The liquid crystal display device, as claimed in claim 5, wherein said converter circuit means includes counter means for counting the switching time of said selected display dots and for counting the time that said selected display dots are in the transmissive state.

7. The liquid crystal display device, as claimed in claim 6, wherein said converter circuit means includes flip-flop means for indicating the row position of said selected display dots and subtraction means for indicating the column position of said selected display dots.

8. The liquid crystal display device, as claimed in claim 3 or 7, wherein said light means selectively directs light to a sequence of display dots, said light receiving means detecting the flickered timing of light passing through said sequence of display dots and producing signals representative thereof, said converter circuit means indicating the sequence of display dots through which said light passes.

9. The liquid crystal display device, as claimed in claim 8, wherein said light receiving means and said light means are formed into a light pen.

10. The liquid crystal display device, as claimed in claim 9, wherein said light means is a light emitting diode.

11. The liquid crystal display device, as claimed in claim 9, wherein said light receiving means is a photo diode.

12. The liquid crystal display device, as claimed in claim 11, wherein said light means is a light emitting diode.

13. The liquid crystal display device, as claimed in claim 10, wherein said light receiving means is a photo transistor.

14. The liquid crystal display device, as claimed in claim 8, wherein said liquid crystal material is in a twisted nematic mode.

* * * * *